(12) United States Patent
Emori et al.

(10) Patent No.: US 6,378,774 B1
(45) Date of Patent: Apr. 30, 2002

(54) IC MODULE AND SMART CARD

(75) Inventors: Susumu Emori; Hidemi Nakajima; Susumu Igarashi; Kazuo Kobayashi, all of Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 0 days.

(21) Appl. No.: 09/568,977

(22) Filed: May 11, 2000

Related U.S. Application Data

(63) Continuation of application No. PCT/JP98/05142, filed on Nov. 16, 1998.

(30) Foreign Application Priority Data

| Nov. 14, 1997 | (JP) | 9-313944 |
| Nov. 14, 1997 | (JP) | 9-313945 |
| Nov. 14, 1997 | (JP) | 9-313946 |

(51) Int. Cl.$^7$ .................................. G06K 19/06
(52) U.S. Cl. ........................ 235/492; 235/441
(58) Field of Search ................. 235/487, 449, 235/380, 448, 440

(56) References Cited

U.S. PATENT DOCUMENTS

| 4,795,898 A | * | 1/1989 | Bernstein et al. | 235/487 |
| 4,874,934 A | * | 10/1989 | Nakahara | 235/448 |
| 5,198,647 A | * | 3/1993 | Mizuta | 235/449 |
| 5,321,240 A | * | 6/1994 | Takahira | 235/380 |
| 5,514,856 A | * | 5/1996 | Kitahara | 235/440 |
| 5,598,032 A | * | 1/1997 | Fidalgo | 257/679 |
| 6,036,100 A | * | 3/2000 | Asami | 235/492 |

FOREIGN PATENT DOCUMENTS

| JP | 7-239922 | 9/1995 |

\* cited by examiner

*Primary Examiner*—Michael G. Lee
*Assistant Examiner*—Ahshik Kim
(74) *Attorney, Agent, or Firm*—Armstrong, Westerman & Hattory, LLP

(57) ABSTRACT

A smart card comprises an IC module and an antenna for non-contact transmission. The IC module has both a contact-type function and a non-contact-type function. In the contact-type function, power reception and signal transmission/reception is effected via an electrical contact. In the non-contact-type function, power reception and signal transmission/reception is effected in a non-contact state by an electromagnetic coupling system without providing the IC card with an electrical contact. The IC module and the antenna comprise first and second coupler coils, respectively, which are disposed to be closely coupled to each other, and the IC module and the antenna are coupled in a non-contact state by transformer coupling. An antenna coil is disposed so as not to overlap an engagement portion for the IC module, which is a region of an external terminal electrode serving as a contact-type electrode, an embossing region, or a magnetic stripe region.

9 Claims, 8 Drawing Sheets

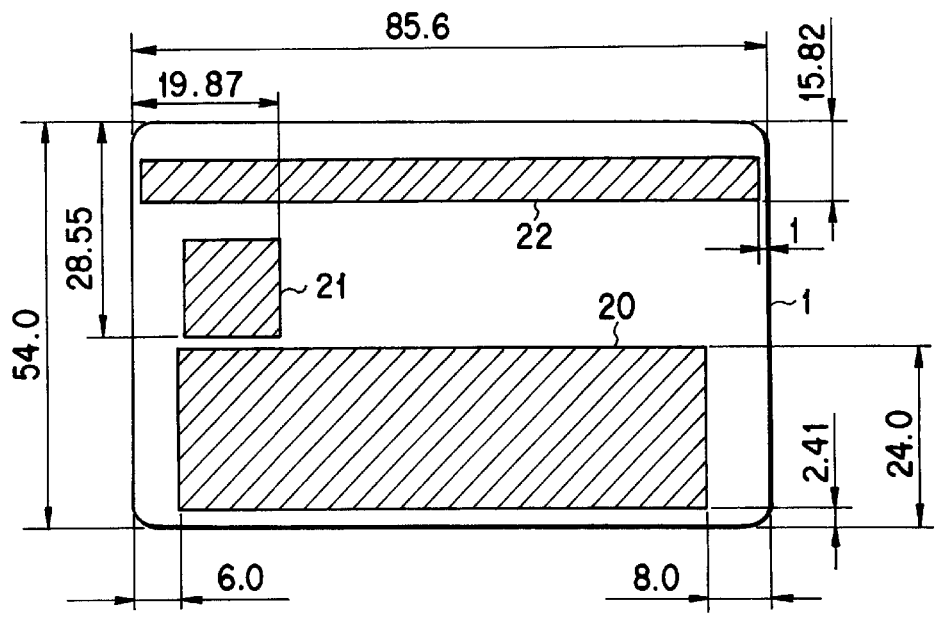
F I G. 1
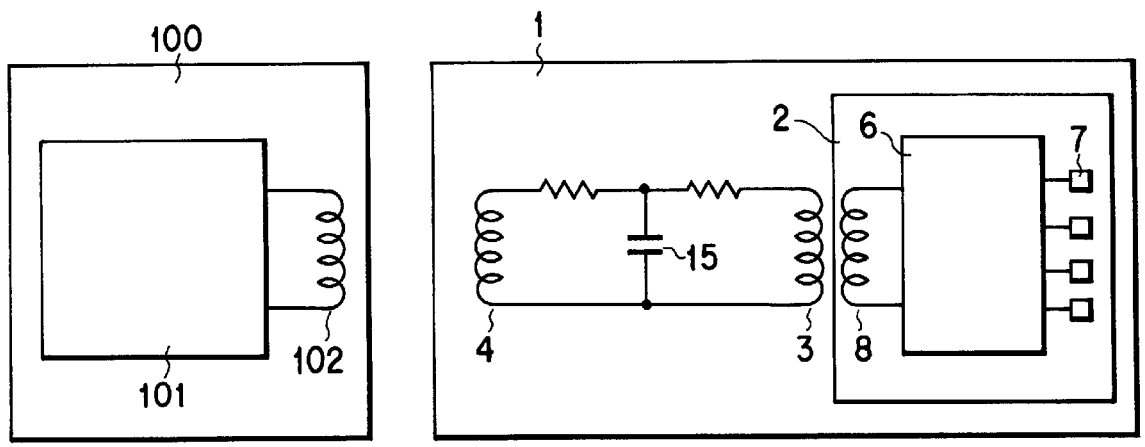
F I G. 2

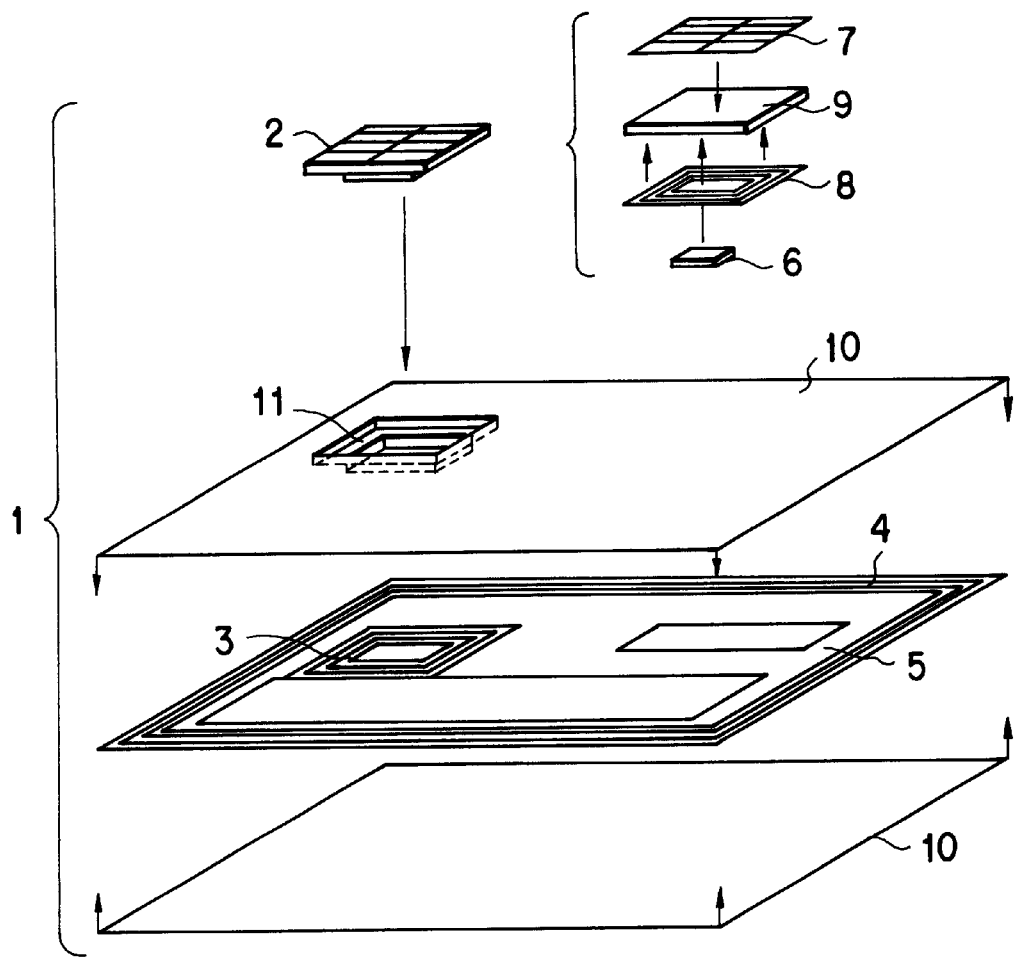
F I G. 3A
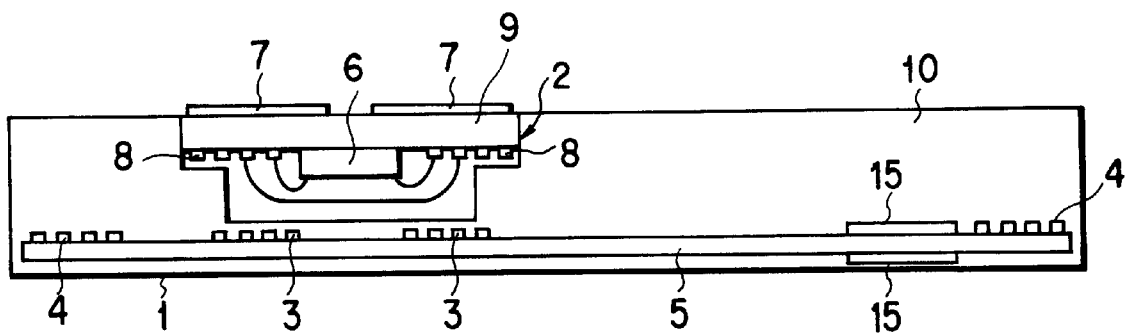
F I G. 3B

IC MODULE AND SMART CARD

CROSS-REFERENCE TO RELATED APPLICATIONS

This is a Continuation of Application PCT/JP98/05142, filed Nov. 16, 1998.

This application is based upon and claims the benefit of priority from the prior Japanese Patent Applications No. 09-313944, filed Nov. 14, 1997; No. 09-313945, filed Nov. 14, 1997; and No. 09-313946, filed Nov. 14, 1997, the entire contents of which are incorporated herein by reference.

BACKGROUND OF THE INVENTION

The present invention relates to a smart card having both a function of a contact type in which reception of supply power, transmission/reception of signals, etc. are performed via an electrical contact, and a function of a non-contact type in which reception of supply power, transmission/reception of signals, etc. are performed without provision of an electrical contact, in an information recording medium represented by IC cards, etc. used in fields such as office automation (OA), factory automation (FA) or security. The present invention also relates to an IC module used for the smart card.

With the advent of IC cards including semiconductor memories, etc., information recording media with greatly increased memory capacities, compared to conventional magnetic cards, etc., have been realized. In addition, with internal provision of a semiconductor integrated circuit device such as a microcomputer, an IC card itself has an arithmetic process function and this provides high security to the information recording medium.

The IC cards are internationally standardized by the ISO (International Organization for Standardization). In general, in an IC card, an IC such as a semiconductor memory is built in a card body formed of a plastic material as a basic material and metallic conductive terminal electrodes are provided on a card surface for connection with an external read/write apparatus. In order to effect data communication between the IC card and external read/write apparatus, the IC card is inserted in a card slot of the external read/write apparatus and the terminal electrodes of the IC card are connected to the external read/write apparatus.

This is suitable for uses requiring security and safety for communication as in large-volume data exchange and banking processing, for example, uses for crediting and electronic wallets.

On the other hand, when the IC card is applied to gate management for entrance/exit, etc., the main purpose for communication is identification and in most cases the amount of communication data is small. Accordingly, simple processing is desired. To solve this problem, a non-contact type IC card has been devised.

With this type of IC card, an oscillation energy field of high-frequency electromagnetism, ultrasonics, light, etc. is provided in the space. The energy is absorbed and converted to an AC power. The AC power is rectified to a DC source for driving an electronic circuit provided in the card. The frequency of an AC component in the field may be used as it is, or multiplied or divided to produce an identification signal. The identification signal is transmitted as data to an information processing circuit formed of a semiconductor device via a coupler such as an antenna coil or a capacitive element.

In particular, most of non-contact type IC cards designed for identification or simple numerical data processing are associated with Radio Frequency Identification (RF-ID) of a hard logic which does not have a battery cell and a CPU (Central Processing Unit). With the advent of the non-contact type IC card, safety from forgery or falsification is enhanced, compared with magnetic cards. Moreover, when a carrier of the card passes through a gate, it should suffice if the carrier approaches the card to an antenna unit of the read/write apparatus attached to the gate apparatus or brings the card into contact with the antenna unit of the read/write apparatus. The carrier does not have to do time-consuming operations of taking the card out of the case and inserting it in the slot in the read/write apparatus.

Recently, in order to apply a single card to many purposes, a smart card has been devised which has the former contact type function with external terminals and the latter non-contact type function with radio-frequency data communication. This smart card has advantages of both types, i.e. high security of the contact type which is realized by CPU processing and convenience of the non-contact type. In either the non-contact type or the composite type, where a power supply is provided in the IC card, there is no need to obtain power from the aforementioned oscillation energy field in the space.

A general mounting method for the smart card will be described blow.

A metallic foil antenna coil for non-contact transmission, which is formed by etching, is sandwiched between a sheet with engagement hole for an IC module and a substrate. The structure is laminated to produce a card body. In this case, two antenna terminals for connection between the antenna coil and the IC module are exposed to an inside of the engagement hole in the card body.

Metallic terminal electrodes for connection with an external apparatus are provided on one surface of the IC module. The other surface is provided with an IC and terminals for connection with the antenna. A conductive adhesive is applied to the terminals. The IC module is mounted in the engagement hole in the card body such that the terminals with the conductive adhesive may overlap the antenna terminals of the card, and then the terminals of the IC module are connected to the antenna terminals with heat and pressure. Thus, the mounting is completed.

This mounting method is relatively simple. However, it is difficult to confirm the state of the connection portion between the IC module and antenna, and a problem remains with the reliability of connection. In addition, degradation in the connection portion may easily occur due to mechanical stress. Moreover, since a step for applying the conductive adhesive and a thermocompression step are required for the connection between the IC module and antenna, it is difficult to use an apparatus for manufacturing a conventional IC card with external terminals. It is thus necessary to provide a new manufacturing line.

In addition, in most of IC cards with the non-contact-type transmission mechanism, an emboss or a magnetic stripe cannot be applied due to restrictions of the coil shape, etc. for keeping reception power. In order to fully meet a demand on the market, the emboss and magnetic stripe have to be considered. Techniques which do not permit provision of an emboss or a magnetic stripe are restricted in the range of application.

A non-contact-type IC card disclosed, for example, in Jpn. Pat. Appln. KOKAI Publication No. 8-227,447 permits provision of an emboss and a magnetic stripe. Specifically, a non-contact-type IC card having an outer shape according to ISO 7811 is provided. In order to provide a magnetic stripe and an emboss on the card, a communication IC module is constructed such that an IC mount portion, a power receiving coil and a data transmission/reception coil are arranged in a longitudinal direction on a region excluding the magnetic stripe region and embossing region.

The reception coil and communication coil of the communication IC module are comprised of single-layer coils formed by electrocasting. Both are buried in a single strip-like substrate. Lead portions for connection with pads of the IC chip are formed of each coil.

The IC chip is mounted on the strip-like substrate such that a circuit surface of the IC chip is opposed to the strip-like substrate. The lead portions are bump-bonded to the IC pads and a gap between the strip-like substrate and IC chip is filled with a potting resin for fixation. An inner end portion of the coil and an end portion of an internal-end lead are jumper-bonded by an enamel copper wire. The bonding is effected by instantaneous thermocompression and terminal portions are protected with potting resin.

A method of integrating this communication IC module and the card is described. According to this method, there are provided a first sheet for covering the upper surface, a second sheet having the same thickness as the strip-like substrate and having a window with a strip-like outer shape, a third sheet having a window for passing the IC chip and a window for passing a first jumper-bonding portion, a fourth sheet having only a window for passing the IC chip, and a fifth sheet for covering the lower surface (all formed of vinyl chloride). The communication module is sandwiched by the respective sheets and subjected to thermocompression. Thus, the communication module is integrated in the card.

Although the above technique is applicable to the non-contact-type IC card, it is not applicable to the smart card having external terminals.

The positions of the terminals of the card with external terminals are specified by ISO 7816. FIG. 1 shows a magnetic stripe region, an embossing region and an external terminal region specified by ISO 7816. In the smart card, an IC module is mounted on the external terminal region. In FIG. 1, in the regions indicated by hatching, mounting of an antenna for non-contact coupling is prohibited.

ISO 7816 specifies an outer long side to be 85.47–85.72 mm, an outer short side to be 53.29–54.03 mm. The magnetic stripe region is defined in an area of 15.82 mm from the upper side. The embossing region is defined in an area of 24 mm from the lower side, 6.0 mm from the left side, and 8.0 mm from the right side. The external terminals are formed in an area of 28.55 mm from the upper side and 19.87 mm from the left side.

For example, Jpn. Pat. Appln. KOKAI Publication No. 7-239,922 discloses a prior-art technique of a smart card realizing a magnetic stripe and embossing.

According to this technique, the IC module for the IC card comprises an IC chip; a transmission mechanism connected to the IC chip for effecting transmission of information and/or power with the external apparatus; and a support member for supporting the IC chip and transmission mechanism. The transmission mechanism comprises a non-contact-type transmission mechanism having a coil or an antenna, and a contact-type transmission mechanism having a plurality of terminal electrodes of patterned conductors provided on a surface of the support member. This document teaches that since the functions compatible with the contact type and non-contact type are constructed as a module and this IC module is fitted and fixed in a plastic card body, the magnetic stripe and embossing can be made without hindrance.

The document further discloses, as mounting means, that the antenna or coil for non-contact transmission is provided so as to surround the terminal electrodes, and alternatively the antenna is positioned at the center and the terminal electrodes are provided around the antenna.

Specifically, the non-contact transmission antenna is contained in the IC module and thereby the connection between the antenna coil and the IC module is omitted in the final step.

In view of the standard illustrated in FIG. 1, however, it is clear that the method in which the antenna coil is provided around the terminal electrodes is not feasible. More specifically, in the method in which the non-contact transmission antenna is contained in the IC module, an adequate antenna area is not obtained, and this permits only a so-called close-contact mode in which the distance for communication is several mm or less.

Since the distance between the terminal electrodes and embossing region is 1.45 mm at maximum, it is not practical to dispose the antenna or coil so as to surround the terminal electrodes without overlapping the terminal electrodes, as will be described below. In the case where the antenna coil is disposed around the external terminals, the maximum outside diameter and minimum inside diameter of the coil are $\phi 12$ mm and $\phi 9.3$ mm, respectively. If the antenna coil is formed of a print pattern in this region, where the pattern width and interval are 0.15 mm and 0.1 mm respectively, the number of turns and the inductance become about four and 0.4 $\mu$H, and six and 1.0 $\mu$H in respective cases ($\mu$H denotes microhenry). Where the coil is disposed around the outer periphery of the terminal electrodes while the embossing region maintained, only several turns are obtained even with the formation of the print coil. Owing to the smallness of the area of the coil, too, adequate power cannot be obtained and only close coupling is permitted with a communication distance being several mm or less.

In this case, the merit of adding the non-contact transmission function is small. The merit of adding the non-contact transmission mechanism to the contact type transmission mechanism is obtained with a communication distance exceeding several-ten mm to 100 mm. Communication is achieved if the card is exposed to the antenna unit of the external read/write apparatus within such an area. For this purpose, it is necessary to increase the area of the coil or the number of turns.

In brief, where the coil is disposed around the outer periphery of the terminal electrodes within the IC module, only several turns are obtained even if the print coil is formed, and owing to the smallness of the area of the coil, too, adequate power cannot be obtained. Moreover, if a practical number of turns is to be obtained with a conductor pattern, it overlaps the embossing region.

On the other hand, in the case of the latter mounting means wherein the terminal electrodes are disposed around the antenna, the embossing area is obviously occupied and the standard of the IC card with external terminals, ISO 7816, is not at all satisfied. The likelihood of acceptance in the market is very low.

Since the smart card is associated with weak radio waves, there is a demand to enhance power transmission efficiency. Prior-art techniques for this purpose are described, for example, in Jpn. Pat. Appln. KOKAI Publication No. 2-7,838 and Jpn. Pat. Appln. KOKAI Publication No. 63-224,635. In these prior-art methods for enhancing the power transmission efficiency, however, attention is paid only to transmission power and these methods are effective only in cases where the transmission-side power efficiency can be improved and more power be sent out. Consequently, where the intensity of a radiant electromagnetic field is limited, these methods do not contribute to the improvement in the reception-side power reception efficiency. In order to improve the power reception performance of the smart card located in a weak electromagnetic field with the non-contact type function of the IC card itself, it is necessary to provide the card with means for absorbing more radiation energy.

Furthermore, since the smart card includes a semiconductor integrated circuit, acquisition of more current with less power is desirable for reduction of a load on the power supply circuit. In order words, it is desirable to lower the power-reception side impedance. In the prior art, however, attention is paid only to the transmission voltage and not to the power reception side.

A first object of the present invention is to overcome the problems in the prior art and provide an IC module having reception sensitivity enough to obtain an adequate communication distance, despite no wired connection disposed between the IC module and a non-contact transmission antenna, and being capable of maintaining both a contact-type and a non-contact-type transmission mechanism in practical operation states, and to provide a smart card including the IC module.

A second object of the present invention is provide a smart card having both functions of contact type and non-contact type and being capable of performing at least either of power reception or signal transmission/reception in a non-contact mode, wherein the carrier wave reception efficiency on the smart card side is enhanced by a coupler in which a power transmission side (reader/writer side) coil is separated from a power reception side (smart card side) antenna with an air gap, thereby improving power efficiency on the power reception side (or signal transmission efficiency) and performing impedance conversion, and to provide an IC module for the smart card.

A third object of the invention is to provide an IC module and a smart card having both a contact-type transmission mechanism and a non-contact-type transmission mechanism and having a magnetic stripe and an embossed portion on a surface of the card, wherein power-reception-side power efficiency is improved and impedance conversion is effected without adversely affecting formation of the magnetic stripe and embossed portion and the thickness of the card can be reduced.

BRIEF SUMMARY OF THE INVENTION (1) A smart card according to the present invention has both a function of a contact type and a function of a non-contact type, the smart card comprising an IC module and an antenna element. The IC module comprises an IC chip incorporating a contact-type transmission function and a non-contact-type transmission function, and a module substrate having an external terminal serving as a contact-type transmission element and a first coupler coil. The antenna element comprises an antenna for performing at least one of power reception and signal transmission/reception with an external read/write apparatus, and a second coupler coil connected to the antenna. The first coupler coil of the IC module and the second coupler coil of the antenna element for non-contact transmission are disposed to be closely coupled to each other, and the IC module and the antenna element are coupled in a non-contact manner by transformer coupling.

(2) According to the invention, in the smart card described in (1), the antenna element has a capacitive element.

(3) According to the invention, the smart card described in (1) or (2) further comprises an embossing region. The IC module is provided at a substantially central portion of one shorter side of the card, and the embossing region is provided along one longer side of the card. The antenna for non-contact transmission is provided so as not to interfere with an external terminal region of the IC module and the embossing region.

(4) According to the invention, the smart card described in (1) or (2) further comprises an embossing region. The IC module is provided at a substantially central portion of one shorter side of the card, and the embossing region is provided along one longer side of the card. The antenna for non-contact transmission is provided so as not to interfere with an external terminal region of the IC module and the embossing region. The antenna is provided at a region defined by a longer side of the card opposed to the one longer side along which the embossing region is provided, a boundary of the embossing region on an inner side of the card, a boundary of the external terminal region of the IC module on the inner side of the card, and a shorter side of the card opposed to the one shorter side at which the IC module is provided.

(5) According to the invention, the smart card described in (1) or (2) further comprises an embossing region. The IC module is provided at a substantially central portion of one shorter side of the card, and the embossing region is provided along one longer side of the card. At least a portion of the antenna for non-contact transmission is disposed between the embossing region and an edge of the card and between an external terminal region of the IC module and an edge of the card, and along a periphery of the card so as not to interfere with the external terminal region of the IC module and the embossing region.

(6) According to the invention, the smart card described in (1) or (2) further comprises a magnetic stripe region and an embossing region. The IC module is provided at a substantially central portion of one shorter side of the card, the embossing region is provided along one longer side of the card, and the magnetic stripe region is provided along the other longer side of the card. The antenna for non-contact transmission is provided so as not to interfere with an external terminal region of the IC module, the embossing region, and the magnetic stripe region.

(7) According to the invention, the smart card described in (1) or (2) further comprises a magnetic stripe region and an embossing region. The IC module is provided at a substantially central portion of one shorter side of the card, the embossing region is provided along one longer side of the card, and the magnetic stripe region is provided along the other longer side of the card. The antenna for non-contact transmission is provided substantially along a boundary of the magnetic stripe region on an inner side of the card, a boundary of the embossing region on an outer peripheral side of the card, and a boundary of an external terminal region of the IC module on the outer peripheral side of the card, so as not to interfere with an external terminal region of the IC module, the embossing region, and the magnetic stripe region.

(8) According to the invention, the smart card described in (1) or (2) further comprises a magnetic stripe region and an embossing region. The IC module is provided at a substantially central portion of one shorter side of the card, the embossing region is provided along one longer side of the card, and the magnetic stripe region is provided along the other longer side of the card. The antenna for non-contact transmission is provided at a region defined by a boundary of the embossing region on an inner side of the card, a boundary of an external terminal region of the IC module on the inner side of the card, a boundary of the magnetic stripe region on the inner side of the card and a shorter side opposed to the one shorter side at which the IC module is provided, so as not to interfere with an external terminal region of the IC module, the embossing region, and the magnetic stripe region.

(9) According to the invention, in the smart card described in (1) or (2), the second coupler coil of the antenna element is disposed outside a loop of the antenna.

(10) An IC module according to the present invention comprises an IC chip incorporating a non-contact-type transmission function and a contact-type transmission function, and a module substrate having a first coupler coil and an external terminal serving as a contact-type transmission element. The first coupler coil is provided on a side of the module substrate which is opposite to a side on which the external terminal is provided, and is formed of a winding coil fabricated by winding conductor wire coated with an insulation film.

(11) According to the invention, in the IC module described in (10), the winding coil is spirally wound on at least one of a periphery and a vicinity of the IC chip.

(12) According to the invention, in the IC module described in (10), the winding coil is toroidally wound on at least one of a periphery and a vicinity of the IC chip.

(13) According to the invention, in the IC module described in (10), the winding coil is wound around an outer peripheral end face of the module substrate.

(14) According to the invention, in the IC module described in any one of (10) to (13), the IC chip and the first coupler coil are resin-sealed on a side of the IC module on which the IC chip is mounted.

(15) According to the invention, in the IC module described in any one of (10) to (13), a size of the module substrate is substantially equal to a size of a region of the external terminal.

(16) An IC module according to the present invention comprises an IC chip incorporating a contact-type transmission function and a non-contact-type transmission function, and a module substrate having a first coupler coil and an external terminal serving as a contact-type transmission element. The first coupler coil is formed of a patterned conductor on a side of the module substrate which is opposite to a side on which the external terminal is provided, and is disposed on at least one of a periphery and a vicinity of the IC chip.

(17) According to the invention, in the IC module described in (16), the coil is wound around a seal member of the IC chip in at least one of a spiral manner and a toroidal manner.

(18) According to the invention, in the IC module described in (16), the IC chip and the first coupler coil are resin-sealed on a side of the IC module on which the IC chip is mounted.

(19) According to the invention, in the IC module described in (16), a size of the module substrate is substantially equal to a size of a region of the external terminal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 shows dimensions of a card with an external terminal, as stipulated by ISO 7816;

FIG. 2 shows an equivalent circuit of a non-contact coupler circuit for describing the principle of a non-contact transmission mechanism according to the present invention;

FIG. 3A and FIG. 3B are an exploded perspective view and a cross-sectional view showing a structure of a first embodiment of a smart card according to the present invention;

DETAILED DESCRIPTION OF THE INVENTION

Figure 4:
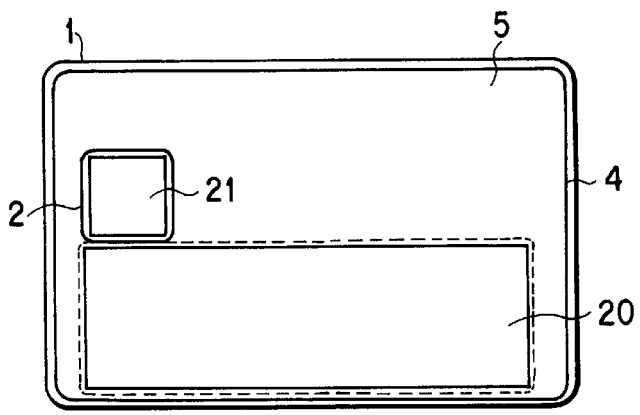
FIG. 4 shows a first example of arrangement of an antenna coil according to the first embodiment.

Embodiments of the smart card according to the present invention will now be described with reference to the accompanying drawings.

To begin with, the basic structure and basic principle of a non-contact transmission mechanism will be described.

FIG. 2 shows an equivalent circuit of a non-contact coupler circuit for describing the principle of the non-contact transmission mechanism according to the present invention. A transmission/reception circuit 101 of a non-contact type external read/write apparatus 100 is connected to a transmission/reception coil 102 which is an electromagnetic coupler for supplying power to, and exchanging information with, the non-contact transmission mechanism in the smart card.

On the other hand, the non-contact transmission mechanism of the smart card 1 comprises an antenna coil 4, connected electromagnetically and directly to the transmission/reception antenna 102 of the external read/write apparatus 100, for receiving power and exchanging information; a capacitive element 15 connected between both ends of the antenna coil 4 to constitute a parallel resonance circuit; an IC chip 6 mounted on an IC module 2; a first coupler coil 8 connected to the IC chip 6; and a second coupler coil 3 closely coupled and disposed to transmit a signal received by the antenna coil 4 to the first coupler coil 8 with a maximum efficiency and connected between both ends of the capacitive element 15 of the parallel resonance circuit.

Although the capacitive element 15 is connected in parallel to the antenna coil 4, it may preferably be connected in series between the antenna coil 4 and second coupler coil 3. If the parasitic capacity is increased, the capacitive element 15 can be dispensed with.

Coupling among the respective coils will now be described, referring to a case where power and information is transmitted from the external read/write apparatus 100 to the smart card 1.

A high-frequency magnetic field is induced in the transmission/reception coil 102 by a high-frequency signal (not shown) produced by the transmission/reception circuit 101 of the external read/write apparatus 100. This high-frequency signal is radiated to the space as magnetic energy.

If the smart card 1 is located in the high-frequency magnetic field at this time, a current is caused to flow in the parallel resonance circuit, which comprises the antenna coil 4 and capacitive element 15 of the smart card 1, due to the high-frequency magnetic field produced by the transmission/reception coil 102 of the external read/write apparatus 100. In this case, currents due to the high-frequency magnetic field are also induced in the first coupler coil 8 connected directly to the IC chip 6 and the second coupler coil 3 connected to the resonance circuit of the antenna coil 4 and capacitive element 15 to transmit power to the first coupler coil 8. The amount of induced currents in this case is less than that of current induced in the antenna coil 4 by an order of magnitude, and accordingly the sensitivity of reception depends greatly on characteristics of the antenna coil 4.

A signal received by the resonance circuit of the antenna coil 4 and capacitive element 15 is transmitted to the second coupler coil 3. Since the second coupler coil 3 and first coupler coil 8 are closely coupled and disposed with a maximum transmission efficiency, the signal is then transmitted to the IC chip 6 via transformer coupling of the second coupler coil 3 and first coupler coil 8. The maximum transmission efficiency of transformer coupling between the second coupler coil 3 and first coupler coil 8 is determined by selection of the circuit constant.

With the above structure, the reception characteristics are improved. As a result, the characteristics of the antenna coil 4 determine the sensitivity of reception. Thus, the larger the area of the antenna coil 4, the greater the advantage.

The antenna characteristics vary depending on the method of the non-contact transmission mechanism, such as electromagnetic coupling, electromagnetic induction, etc. The antenna coil characteristics with the electromagnetic induction method in a short-wave band are calculated, for example, as shown in TABLE 1.

TABLE 1

| Example | COIL AREA (LONG SIDE × SHORT SIDE) | NUMBER OF COIL TURNS | |
|---|---|---|---|
| | | INDUCTANCE 5 μH | INDUCTANCE 20 μH |
| 1 | 84 mm × 53 mm | 4 turns | 10 turns |
| 2 | 84 mm × 37 mm | 5 turns | 11 turns |
| 3 | 64 mm × 28 mm | 6 turns | 14 turns |
| 4 | 64 mm × 13 mm | 7 turns | 16 turns |
| 5 | 12 mm × 12 mm | 15 turns*[1] | 30 turns |

In TABLE 1, the thickness and pitch of the coil are 0.05 mm in the case of *1 alone. In the other cases, the thickness and pitch of the coil are 0.15 mm.

For instance, the inductance of the antenna coil of the currently used RF-ID card for the short-wave band is about 5 microhenries. This type of antenna coil can be disposed on an outer peripheral portion of the card by means of a print pattern (print coil).

Referring back to FIG. 1, at the lower part of the card, the distance between the embossing region and the periphery of the card takes a minimum value, i.e. 2.41 mm. If a spiral coil is formed from a point, which is 1 mm inside the edge of the card, toward the center of the card, with the pattern width and the pattern interval being set at 0.15 mm, the spiral coil can have five turns at maximum. Where the pattern width and the pattern interval are set at 0.1 mm, the coil can have seven turns at maximum.

Fifteen turns are required to obtain an inductance of 5 microhenries, if an antenna coil is provided around the external terminals of the IC module, as in the prior-art technique of Jpn. Pat. Appln. KOKAI Publication No. 7-239,922, and the coil is disposed at the width of 1.45 mm as specified by the Standard. In this case, both the pattern width and interval have to be set at 0.05 mm or less, and this is unrealizable.

On the other hand, in the case of an antenna coil of a low-frequency electromagnetic coupling system, the number of turns exceeding seven may be required.

Consider a structure requiring an antenna coil having an inductance of, e.g. 20 microhenries. In this case, it is understood, from TABLE 1, that coils having 10 to 30 turns can be obtained according to the coil area.

Coils having more than eight turns can be realized by a spiral coil of a three-dimensional shape and a planer print coil. In the case of the spiral coil, it is wound in an overlapping manner and thus can be disposed at an outer peripheral portion of the card. In the case of the print coil, it is generally formed in a non-overlapping manner. Accordingly, where the number of turns is large, it is not proper to dispose the coil at the outer peripheral portion of the card so as to avoid overlapping with the embossing region.

In this case, if the antenna coil is disposed such that mounting prohibition areas of the magnetic stripe, embossing and external terminals may not be included inside the antenna coil, the card can be fabricated at low cost with simple manufacturing process and with high reliability.

First Embodiment

FIG. 3A and FIG. 3B show a schematic structure of a smart card according to a first embodiment of the present invention. FIG. 3A shows the whole structure and FIG. 3B shows a cross-sectional structure of the mounting portion of the IC module.

The smart card 1 according to this embodiment comprises card substrates 10 resin-seal an antenna substrate 5 which includes an IC module 2, a second coupler coil 3 and an antenna coil 4 formed of print coils on a resin sheet surface of the antenna substrate 5. The IC module 2 comprises an IC chip 6 incorporating a contact-type interface and a non-contact-type interface (not shown) and a module substrate 9 having terminal electrodes 7 serving as a contact-type transmission section and a first coupler coil 8 of a non-contact-type transmission section which are formed on different surfaces by patterning.

Instead of forming the first coupler coil 8 and antenna coil 4 of print coils, they may be formed by winding insulation-coated conductor wires. The IC chip 6 is mounted on the surface of module substrate 9, on which the first coupler coil 8 is formed. The IC chip 6 is connected to the terminal electrodes 7 of module substrate 9 via through-holes.

The IC chip 6 and a circuit pattern of first coupler coil 8 are wire-bonded to constitute a circuit. This bonding may also be realized by thermal fusion using solder or conductive adhesive, which is applied to the circuit formation surface of the IC chip and the substrate.

The IC chip 6 is mounted on the module substrate, and circuit connection is carried out. Then, the IC chip 6 is resin-sealed and the fabrication of the IC module 2 is completed.

In general terms, the smart card 1 according to the present embodiment is fabricated in a manner described below.

To start with, the flexible antenna substrate 5 having the second coupler coil 3, antenna coil 4 and capacitive element 15 formed of print coils on a resin substrate is prepared. The second coupler coil 3 and antenna coil 4 may be formed by winding insulation-coated conductor wires. The resin material of the antenna substrate 5 may be vinyl chloride, or polyimide, polycarbonate, or PET. The material is not limited to one kind.

The antenna substrate 5 is sealed by injection molding to form the card substrate 10. In the formation, the second coupler coil 3 is positioned to overlap the mounting position of the IC module 2. Simultaneous with the fabrication of the card substrate 10 by means of injection molding, an engagement hole 11 for the IC module 2 is formed.

At last, the IC module 2 is attached in the engagement hole 11 in the card substrate 10 for engagement with the IC module 2, and fabrication of the smart card 1 is completed. The card substrate is formed of vinyl chloride, but other materials such as polycarbonate are applicable to the present invention if characteristics of the card such as adequate strength and embossing processability are obtained.

In FIG. 3A, the card substrate 10 is shown as being divided into an obverse side portion and a reverse side portion. However, the card substrate 10 is actually a single piece. In the figure, the card substrate is shown in a modified fashion in order to clearly describe a relationship between the coupler coil and engagement hole 11 of the antenna substrate 5 which is sealed in the card substrate.

In the present embodiment, the card is fabricated by injection molding. Any method, however, is applicable to the present invention if characteristics of embossing are maintained. For instance, a laminating method or an adhesive filling method may be adopted. In this embodiment, the engagement hole 11 for the IC module is made by cutting after the fabrication of the card.

Example 1 of Mounting

FIG. 4 is a plan view of the first embodiment of the smart card having an embossing region, showing a position of mounting of the antenna coil 4 within the smart card 1. The antenna coil 4 is disposed over the entire peripheral portion of the card. The embossing region 20 and external terminal region 21 are disposed within the loop of the antenna coil 4. The specifications of this coil correspond to example 1 in TABLE 1.

The example of FIG. 4 is effective where the number of turns of antenna coil 4 is relatively small, specifically, 3 to 7, and preferably 4 or 5. As regards the antenna substrate 5 in this example of mounting, that portion of the resin sheet, which corresponds to the embossing region 20, is cut out. This aims at preventing an adverse effect on embossing characteristics.

In FIGS. 4 to 7, the outer contours of the antenna substrates 5 are indicated by broken lines.

Example 2 of Mounting

Figure 5:
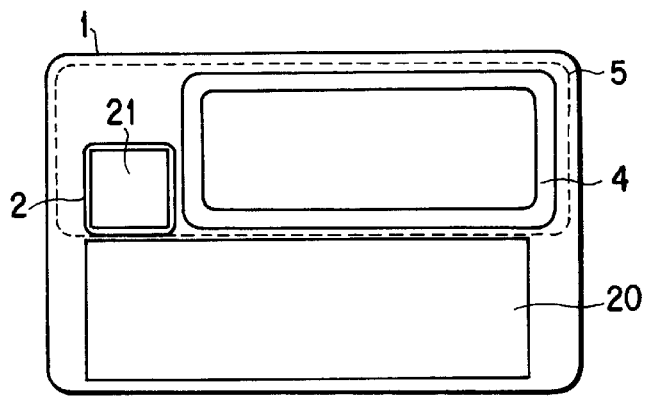
FIG. 5 shows a second example of arrangement of the antenna coil according to the first embodiment.

FIG. 5 is a plan view of another smart card 1 according to the first embodiment having the embossing region. This figure shows a general shape of the antenna coil 4, on the outside of which the embossing region 20 and external terminal region 21 are disposed (i.e. not within the antenna coil). The specifications of this coil correspond to example 3 in TABLE 1. The example of FIG. 5 is effective where the number of turns of the antenna coil 4 is 10 or more.

Example 3 of Mounting

Figure 6:
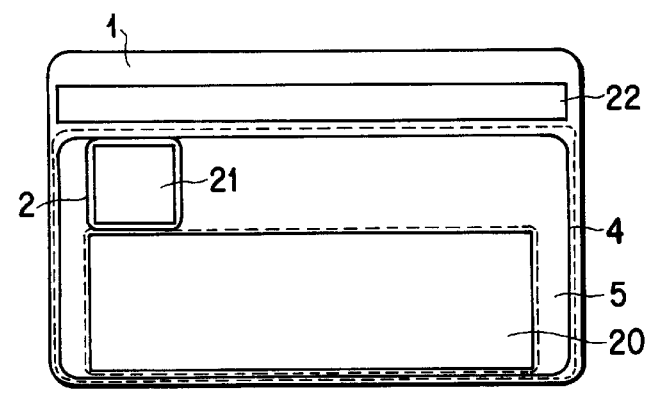
FIG. 6 shows a third example of arrangement of the antenna coil according to the first embodiment.

FIG. 6 is a plan view of a third example of mounting of the smart card 1 according to the first embodiment, which has both the magnetic stripe and embossing region. This figure shows a position of mounting of the antenna coil 4 in the smart card 1. The antenna coil 4 is made not to overlap the magnetic stripe region 22. That portion of the antenna coil, which excludes a portion thereof opposed to the magnetic stripe region, is disposed along the outer periphery of the smart card 1. The specifications of this coil correspond to example 2 in TABLE 1. As regards the antenna substrate 5 in this example of mounting, too, that portion of the resin sheet, which corresponds to the embossing region 20, is cut out. This aims at preventing an adverse effect on embossing characteristics.

Example 4 of Mounting

Figure 7:
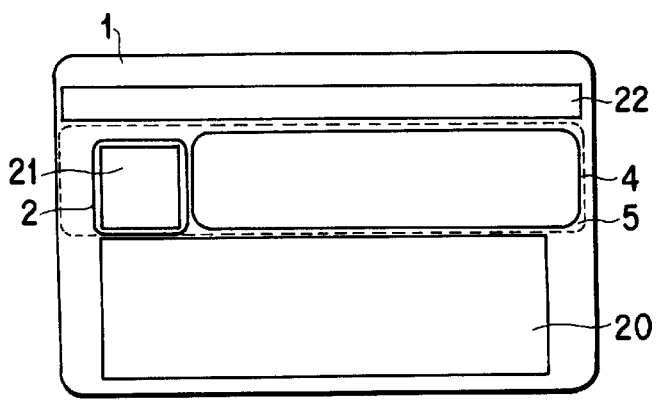
FIG. 7 shows a fourth example of arrangement of the antenna coil according to the first embodiment.

FIG. 7 is a plan view of a fourth example of mounting of the smart card 1 according to the first embodiment, which has both the magnetic stripe and embossing region. This figure shows a general shape of the antenna coil 4 which is disposed not to include the embossing region 20 or magnetic stripe region 22. The specifications of this coil correspond to example 4 in TABLE 1.

The smart card according to the first embodiment has functions compatible with both the contact-type system with external terminals and the non-contact-type system with non-contact coupling elements such as an antenna coil. By providing the IC module and antenna coil with transformer-coupling circuit elements, power reception and signal transmission/reception can be effected between the IC module and antenna coil without electrical connection.

With this structure, the area of the antenna coil is increased to a maximum permissible level. When the card is exposed to the vicinity of the antenna of the external read/write apparatus, communicable sensitivity characteristics can be maintained, which is the advantage of the non-contact communication function.

Since the reception sensitivity of the card is enhanced, the communication distance is increased and/or the transmission output of the external read/write apparatus can be reduced. This is convenient for cards since the transmission output is restricted by the Wireless Telegraphy Act.

Moreover, since no connection is required between the IC module and the antenna circuit built in the card substrate, it is possible to use, without any modification, the conventional IC card fabrication step of attaching and mounting the IC module in the engagement hole formed in the card substrate. Furthermore, even if a mechanical stress such as a bending stress acts on the card, there is little possibility of fault because of the absence of any contact point between the IC module and the antenna circuit.

Since the antenna coil which is directly brought into non-contact coupling with the external read/write apparatus is so disposed as not to overlap the external terminal region of the non-contact-type electrodes, which is also the IC module engagement region, the embossing region and/or the magnetic stripe region, this invention permits general-purpose applications and is fully applicable to conventional cards.

Since injection molding is adopted and the base material of the flexible antenna substrate is not present in the area corresponding to the embossing region, embossing properties are not affected by the attachment of plural sheets.

Since the antenna substrate including the antenna coil is formed of a flexible printed wiring board and the coil is formed in a planar shape, the thickness of the card can be set to fully meet the standard of ISO 7816, i.e. 0.76 mm.

As is understood from FIG. 2, the increase in the number of turns of the first coupler coil 8 increases a coefficient of coupling with the second coupler coil 3, and energy to be transmitted to the IC chip 6 further increases. In the current technique for fabricating printed wiring boards, the limit pattern width is 0.1 mm. It is difficult to form several-ten turns of a print coil in the module substrate of the IC card. On the other hand, where a coil is formed of an insulation-coated conductor wire, a diameter of several-ten microns is attained by virtue of development in magnetic head technology. In the present embodiment, paying attention to this technology, the coupler coils for the IC module and antenna may be formed of an insulation-coated conductor wire.

As has been described above, according to the present embodiment, there is provided a smart card wherein no connection is required between the IC module and non-contact transmission antenna coil, a reception sensitivity capable of obtaining an adequate communication distance is attained, the IC card is compatible with both embossing processing and magnetic stripe formation, and both a contact-type and a non-contact-type transmission mechanisms are maintained in practical operation states.

Other embodiments of the smart card according to the present invention will now be described. In the descriptions of the other embodiments, those elements common with the first embodiment are denoted by like reference numerals, and a description thereof is omitted.

Second Embodiment

An equivalent circuit of a non-contact coupling circuit according to a second embodiment is the same as that according to the first embodiment, as shown in FIG. 2.

In a case of an air-core transformer type coupling as illustrated in FIG. 2, a reduction of a gap between a coils increases transmission efficiency. Unlike the first embodiment in which the first and second coupler coils are vertically arranged, the inside diameter of the second coupler coil, in the second embodiment, is made larger than the engagement hole for the IC module 2 in a card substrate (not shown). The first coupler coil 8 is surrounded by the second coupler coil 3, and both are substantially disposed in the same plane. At this time, the inside of the second coupler coil 3 serves also as the engagement hole.

Thereby, compared to the case where the second coupler coil 3 is disposed below the engagement hole for the IC module 2, there is no need to consider depth precision in forming the engagement hole. Equipment for forming an engagement hole in an IC card with external terminals can be applied as it is.

Figure 8A:
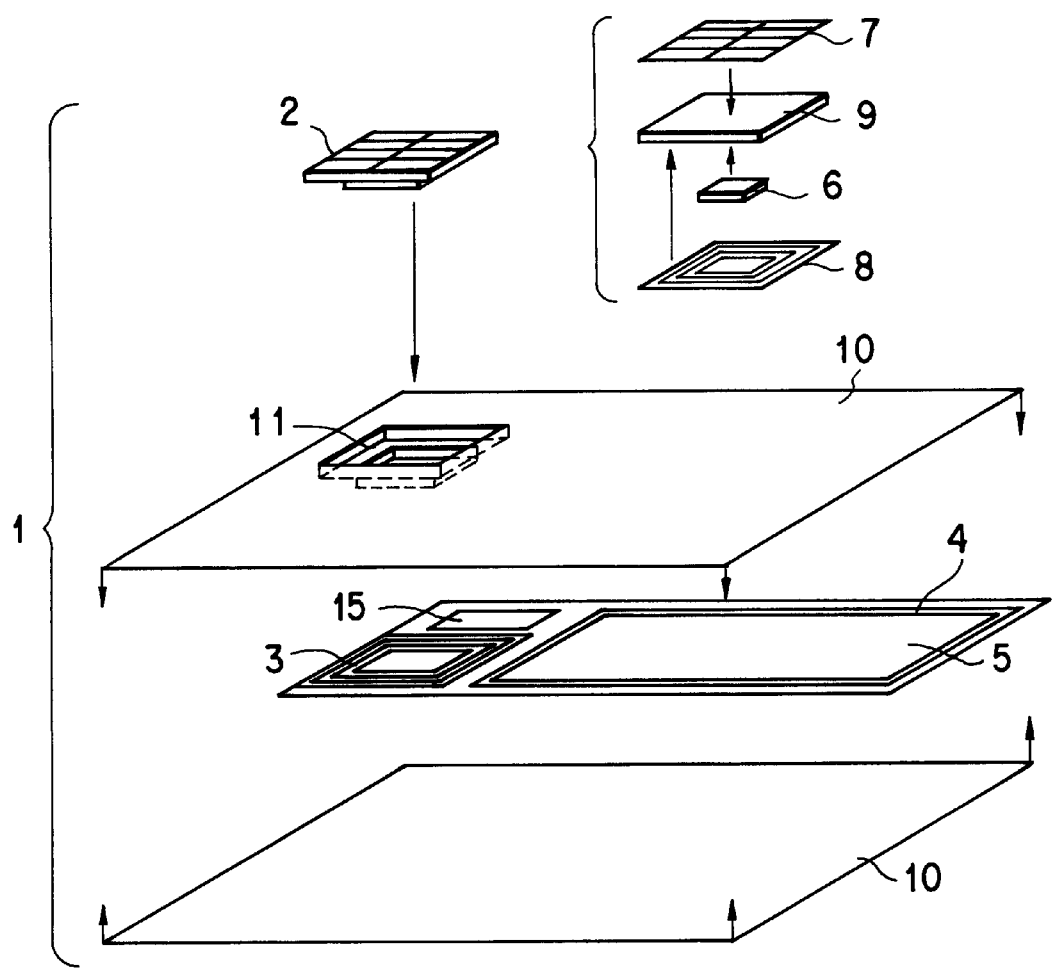
FIG. 8A and FIG. 8B are an exploded perspective view and a cross-sectional view showing a structure of a second embodiment of a smart card according to the present invention.
Figure 8B:
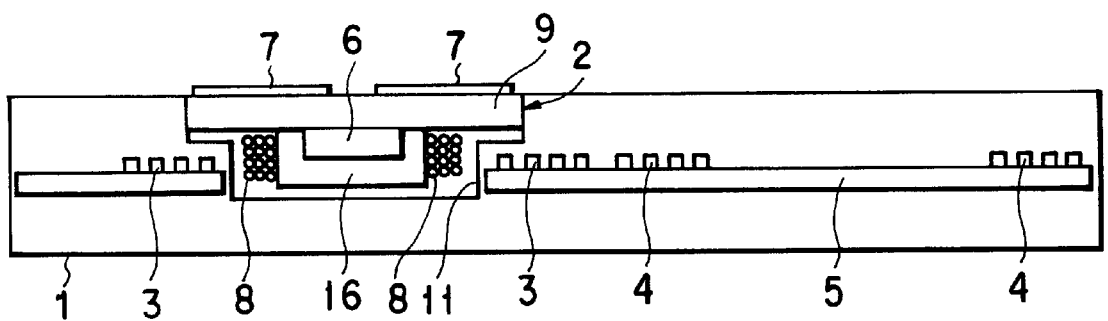

FIGS. 8A and 8B show schematic structures of the smart card according to the second embodiment of the present invention. FIG. 8A shows the whole structure and FIG. 8B shows a cross-sectional structure of the mounting portion of the IC module.

The smart card 1 according to this embodiment comprises the IC module 2 of the present invention, and the card substrate 10 wherein the antenna substrate 5 having the second coupler coil 3 and the antenna coil 4 formed of print coils on a resin sheet surface is resin-sealed.

The IC module 2 comprises the patterned terminal electrodes 7 serving as a contact-type transmission section; the IC chip 6 incorporating a contact-type interface and a non-contact-type interface (not shown); the first coupler coil 8 of a non-contact-type transmission section which is formed of an insulation-coated conductor wire around the IC chip 6 or module substrate 9; and the module substrate 9.

The IC chip 6 is mounted on a surface of the module substrate 9, which is opposite to a surface thereof provided with the terminal electrodes 7. The IC chip 6 and the terminal electrodes 7 on the module substrate 9 are connected via through-holes. The IC chip 6 and a circuit pattern on the module substrate 9 for connecting the terminal electrodes 7 and first coupler coil 8 are bonded by means of thermal fusion using solder or conductive adhesive. This bonding is also realized by wire-bonding the circuit formation surface of the IC chip 6 and the module substrate 9.

The IC chip 6 is mounted on the module substrate 9, and circuit connection is carried out. Then, the IC chip 6 is sealed with a seal resin 16, as shown in FIG. 8A. Following this, an insulation-coated conductor wire is wounded around the periphery of the IC chip 6 or the periphery of the module substrate 9, thereby forming the first coupler coil 8. Subsequently, the circuit pattern on the module substrate 9 and the terminals of the first coupler coil 8 are connected and the IC module 2 is completely fabricated.

FIG. 8B shows a case where the first coupler coil 8 is wound around the seal resin 16 of the IC chip 6. In preparation for the formation of the first coupler coil 8, the periphery of the seal resin 16 of the IC module 2, which has been formed up to the step of formation of the seal resin 16, is processed by cutting means, etc. so as to facilitate winding of a coil. Subsequently, a coil is directly wound around the resin seal 16 of the IC module by using a winding device (not shown).

After a predetermined number of turns have been wound, the insulation coating (not shown) of the connection terminals of the first coupler coil 8 are removed and the connection terminals are connected to a predetermined circuit pattern (not shown) on the module substrate 9.

In this case, the step of cutting the seal resin 16 can be omitted by forming the seal resin 16 with use of a mold, etc.

which facilitates the winding of the coil. This embodiment also includes a technique wherein a coil is not directly wound around the periphery of the IC chip 6 and, instead, a planar coil is formed in a different step using a coil winding machine and is attached to the module substrate 9 to produce the first coupler coil 8, following which the seal resin 16 is provided to cover the IC chip 6 and first coupler coil 8.

In this embodiment, the cross-sectional shape of the formed coil is rectangular with rounded corners, but it may be circular. The cross-sectional shape is not limited.

In general terms, the smart card 1 according to this embodiment is fabricated in the following manner.

To begin with, as shown in FIGS. 8A and 8B, the antenna substrate 5 is prepared, wherein the second coupler coil 3, antenna coil 4 and capacitive element 15 are formed of print coils on different regions on the resin substrate.

As is shown in FIG. 8B, the second coupler coil 3 on the antenna substrate 5 is formed outside the engagement hole 11 for the IC module 2. The second coupler coil 3 is finally nested in substantially the same plane as the first coil 8 mounted in the IC module 2. The second coupler coil 3 and antenna coil 4 may be formed of insulation-coated wire.

Vinyl chloride is used as the resin material of the antenna substrate 5. However, polycarbonate, PET, or polyimide may be applied. The material is not limited to one kind. The thickness of the antenna substrate 5 is in a range of 50 $\mu$m to 300 $\mu$m, and preferably about 100 $\mu$m.

Then, by sealing the antenna substrate 5 by injection molding, the card substrate 10 is formed. In the molding, the second coupler coil 3 is positioned to overlap the position of mounting of the IC module 2. After the card substrate 10 is formed by the injection molding, the engagement hole 11 for the IC module 2 is formed.

At last, the IC module 2 is bonded in the engagement hole 11 for IC module 2 in the card substrate 10 and the fabrication of the smart card 1 is completed. Although vinyl chloride is used as the material of the card substrate 10, any material such as polycarbonate may be applicable to the present invention if adequate characteristics of the card are obtained. In FIG. 8A, the card substrate 10 is shown as being divided into an obverse side portion and a reverse side portion. However, the card substrate 10 is actually a single piece. In FIG. 8A, the card substrate is shown in a modified fashion in order to clearly describe a relationship between the coupler coil and engagement hole 11 of the antenna substrate 5 which is sealed in the card substrate.

In the present embodiment, the card is fabricated by injection molding. Any method, however, is applicable to the present invention if characteristics of the card are maintained. For instance, a laminating method or an adhesive filling method may be adopted. This embodiment includes a technique wherein the engagement hole 11 for the IC module is formed at the same time as the card is formed. In this case, the inside of the second coupler coil 3 on the antenna coil 5 is cut out in advance for engagement with the IC module.

Example 1 of Mounting

Figure 9:
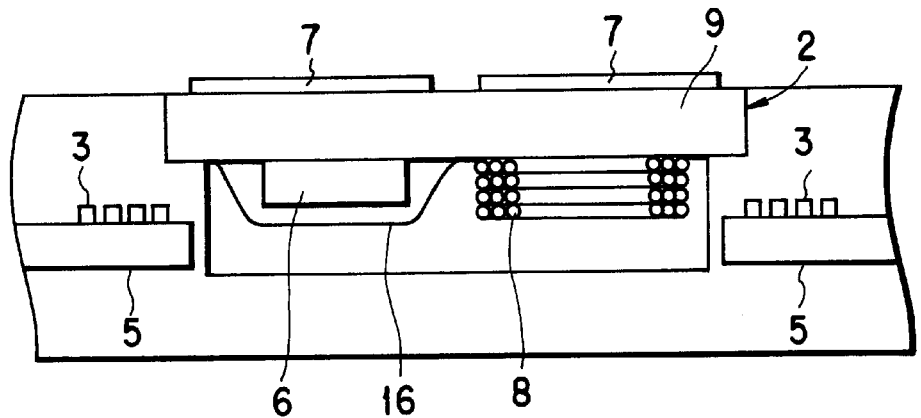
FIG. 9 shows a first example of arrangement of an antenna coil according to the second embodiment.

FIG. 9 shows an example of mounting, in which the first coupler coil 8 is wound near the IC chip 6. In this example, the IC chip 6 is eccentrically mounted on the module substrate 9. The first coupler coil 8 formed separately by using a winding machine (not shown) is attached to the module substrate 9 of the IC module 2 which has been fabricated up to the step of forming the seal resin 16. Connection terminals (not shown) of the first coupler coil 8 are connected to a predetermined circuit pattern (not shown) on the module substrate 9. Thus, the IC module 2 is completely fabricated. Thereby, the step of processing the periphery of the resin seal portion to mount the first coil 8 is not required. Although the cross-sectional shape of the formed coil is rectangular with rounded corners, it may be circular or oval. The cross-sectional shape is not limited.

Example 2 of Mounting

Figure 10:
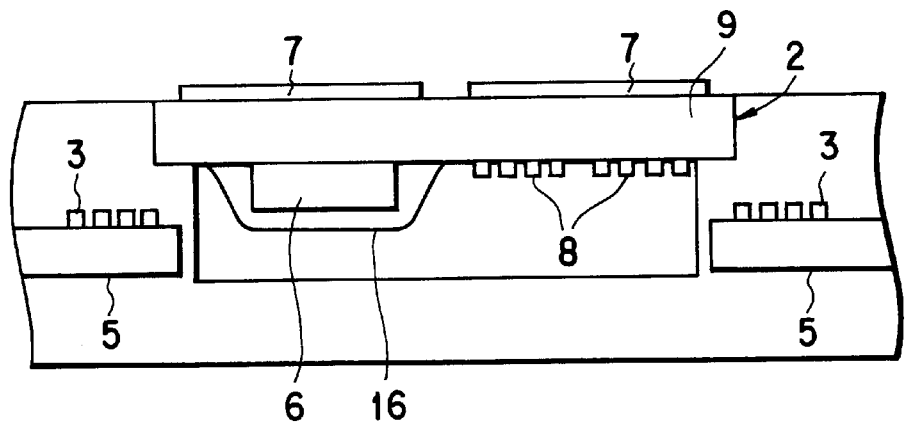
FIG. 10 shows a second example of arrangement of the antenna coil according to the second embodiment.

FIG. 10 shows an example of mounting, in which the first coupler coil 8 is formed of a conductor print pattern on that surface of the module substrate 9, on which the IC chip 6 is mounted, such that the first coupler coil 8 is disposed near the IC chip 6.

Figure 11:
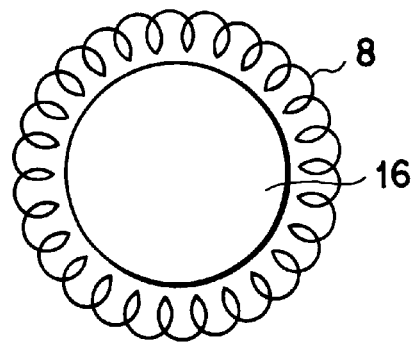
FIG. 11 shows a third example of arrangement of the antenna coil according to the second embodiment.

Since the first coupler coil 8, as well as the external terminals on the upper surface of the module substrate 9 and the IC chip 6 on the back surface thereof, is formed simultaneously with connection patterns, the connection between the module substrate 9 and first coil 8 is made simpler. Although the cross-sectional shape of the first coupler coil 8 in this embodiment is rectangular with rounded corners, it may be circular or oval. The cross-sectional shape is not limited. For example, as is shown in FIG. 11, if the first coupler coil 8 with a toroidal shape is wound around the periphery of the seal resin 16 of the IC chip, the directivity to the induction electromagnetic field is increased and the degree of coupling is enhanced.

The IC module according to the second embodiment has functions compatible with both the contact-type system with external terminals and the non-contact-type system with non-contact coupling elements such as an antenna coil. By providing the IC module and antenna coil with transformer-coupling circuit elements, power reception and signal transmission/reception can be effected between the IC module and antenna coil without electrical connection.

In this smart card, the inside diameter of the second coupler coil of the non-contact-transmission antenna element is made greater than the outside diameter of the engagement hole for the IC module, the first coupler coil disposed on the IC module is formed on the back surface of the module substrate, and the first and second coupler coils are disposed in substantially the same plane. Thereby, the gap is reduced and a higher coupling coefficient is obtained.

As a result, electromagnetic energy received by the antenna coil can be transmitted to the IC chip by transformer coupling with a high coupling coefficient.

Accordingly, when the card is exposed to the vicinity of the antenna of the external read/write apparatus, communicable sensitivity characteristics can be enhanced, which is the advantage of the non-contact communication function.

Since the reception sensitivity of the card is enhanced, the communication distance is increased and/or the transmission output of the external read/write apparatus can be reduced. This is convenient for the non-contact transmission function because the transmission output is restricted by the Wireless Telegraphy Act.

In addition, the inside of the second coupler coil of the non-contact-transmission antenna element serves as the engagement hole for the IC module. Thereby, compared to the case where the second coupler coil is disposed below the engagement hole for the IC module, there is no need to consider depth precision in forming the engagement hole. Conventional equipment for forming an engagement hole in an IC card with external terminals can be applied as it is. Moreover, no connection is required between the IC module and the antenna circuit built in the card substrate. Even if a mechanical stress such as a bending stress acts on the card, there is little possibility of fault due to breakage of connection terminals, because of the absence of any contact point between the IC module and the antenna circuit.

Since the second coupler coil of the non-contact-transmission antenna element is disposed outside the antenna loop, projection of the antenna coil to the embossing region is prevented.

As has been described above, according to the second embodiment, there is provided a smart card wherein, despite no connection being required between the IC module and non-contact transmission antenna coil, a reception sensitivity capable of obtaining an adequate communication distance is attained and both a contact-type and a non-contact-type transmission mechanism are maintained in practical operation states. In addition, there is provided an IC module which is suitably applicable to this smart card.

Third Embodiment

An equivalent circuit of a non-contact coupling circuit according to a third embodiment is the same as that according to the first embodiment, as shown in FIG. 2.

Figure 12A:
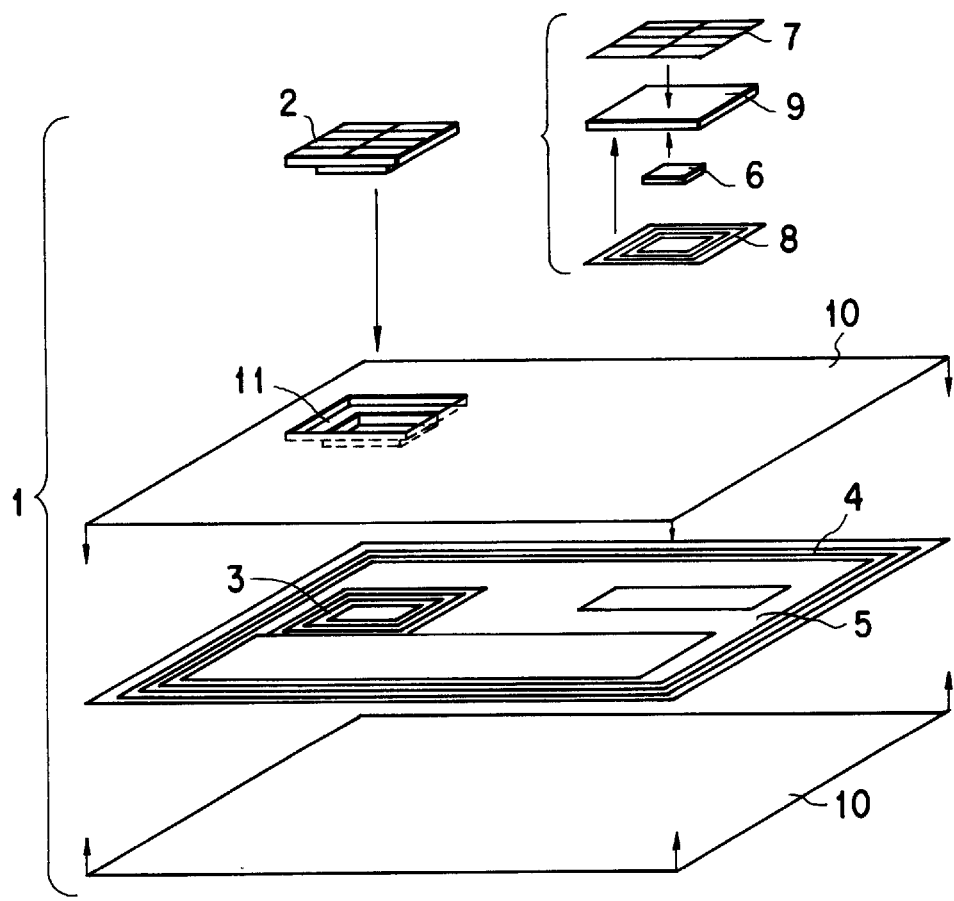
FIG. 12A and FIG. 12B are an exploded perspective view and a cross-sectional view showing a structure of a third embodiment of a smart card according to the present invention.
Figure 12B:
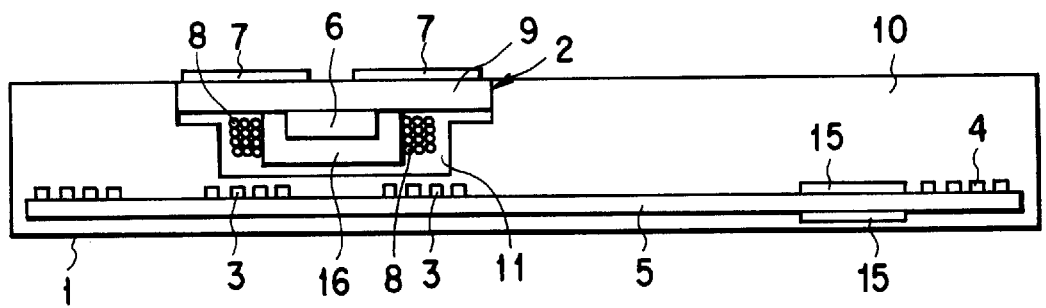

FIGS. 12A and 12B show schematic structures of the smart card according to the third embodiment of the present invention. FIG. 12A shows the whole structure and FIG. 12B shows a cross-sectional structure of the mounting portion of the IC module.

The smart card 1 according to this embodiment comprises the IC module 2 and the card substrate 10 wherein the antenna substrate 5 having the second coupler coil 3 and the antenna coil 4 formed of print coils on a resin sheet surface is resin-sealed.

The IC module 2 comprises the patterned terminal electrodes 7 serving as a contact-type transmission section; the IC chip 6 incorporating a contact-type interface and a non-contact-type interface (not shown); the first coupler coil 8 of a non-contact-type transmission section which is formed of an insulation-coated conductor wire around the IC chip 6 or module substrate 9; and the module substrate 9.

The IC chip 6 is mounted on a surface of the module substrate 9, which is opposite to a surface thereof provided with the terminal electrodes 7. The IC chip 6 and the terminal electrodes 7 on the module substrate 9 are connected via through-holes. The IC chip 6 and a circuit pattern of the first coupler coil 8 are bonded by means of thermal fusion using solder or conductive adhesive.

This bonding is also realized by wire-bonding the circuit formation surface of the IC chip 6 and the module substrate 9.

The IC chip 6 is mounted on the module substrate 9, and circuit connection is carried out. Then, the IC chip 6 is sealed with the seal resin 16. Following this, an insulation-coated conductor wire is wounded around the periphery of the IC chip 6 or the periphery of the module substrate 9, and the circuit pattern on the module substrate 9 and the terminals of the first coupler coil 8 are connected and the IC module 2 is completely fabricated. FIG. 12B shows a case where the first coupler coil 8 is wound around the seal resin 16 of the IC chip 6.

In general terms, the smart card 1 according to this embodiment is fabricated in the following manner.

To begin with, the flexible antenna substrate 5 is prepared, wherein the second coupler coil 3, antenna coil 4 and capacitive element 15 are formed of print coils on the resin substrate. In this case, the second coupler coil 3 and antenna coil 4 may be formed of insulation-coated wire. Vinyl chloride is used as the resin material of the antenna substrate 5. However, polyimide, polycarbonate, or PET may be applied. The material is not limited to one kind.

Then, by sealing the antenna substrate 5 by injection molding, the card substrate 10 is formed. In the molding, the second coupler coil 3 is positioned to overlap the position of mounting of the IC module 2. The engagement hole 11 for the IC module 2 is formed simultaneously with the formation of the card substrate 10 by the injection molding. At last, the IC module 2 is bonded in the engagement hole 11 for IC module 2 in the card substrate 10 and the fabrication of the smart card 1 is completed. Although vinyl chloride is used as the material of the card substrate 10, any material such as polycarbonate may be applicable to the present invention if adequate characteristics of the card are obtained.

In FIG. 12A, the card substrate 10 is shown as being divided into an obverse side portion and a reverse side portion. However, the card substrate 10 is actually a single piece. In FIG. 12A, the card substrate is shown in a modified fashion in order to clearly describe a relationship between the coupler coil and engagement hole 11 of the antenna substrate 5 which is sealed in the card substrate. In the present embodiment, the card is fabricated by injection molding. Any method, however, is applicable to the present invention if characteristics of the card are maintained. For instance, a laminating method or an adhesive filling method may be adopted. This embodiment includes a technique wherein the engagement hole 11 for the IC module is processed by cutting after the card is formed.

Example 1 of Mounting

Figure 13:
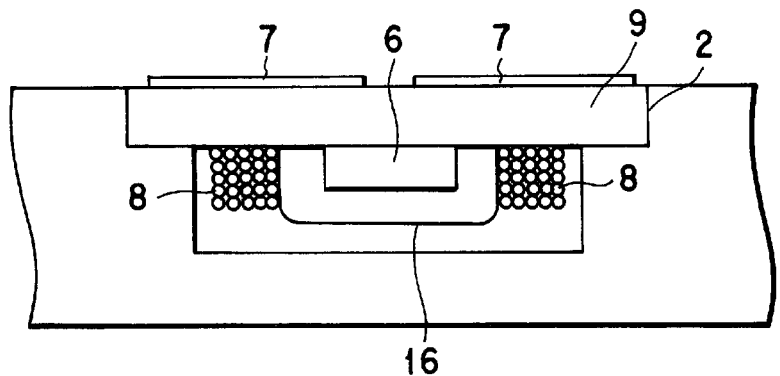
FIG. 13 shows a first example of arrangement of an antenna coil according to the third embodiment.

FIG. 13 shows an example of mounting, wherein the first coupler coil 8 is wound around the IC chip 6.

In preparation for the formation of the first coupler coil 8, the periphery of the seal resin 16 of the IC module 2, which has been formed up to the step of formation of the seal resin 16, is processed by cutting means, etc. so as to facilitate winding of a coil. Subsequently, a coil is directly wound around the resin seal 16 of the IC module by using a winding device (not shown). After a predetermined number of turns have been wound, the insulation coating (not shown) of the connection terminals of the first coupler coil 8 are removed and the connection terminals are connected to a predetermined circuit pattern (not shown) on the module substrate 9.

In this case, the step of cutting the seal resin 16 can be omitted by forming the seal resin 16 with use of a mold, etc. which facilitates the winding of the coil. The coil may not be directly wound around the periphery of the IC chip 6, and a planar coil may be formed in a different step using a coil winding machine and attached to the module substrate 9 to produce the first coupler coil 8.

In this embodiment, the cross-sectional shape of the formed coil is rectangular with rounded corners, but it may be circular or oval. The cross-sectional shape is not limited.

As is shown in FIG. 11, if the first coupler coil 8 with a toroidal shape may be wound around the periphery of the seal resin 16 of the IC chip.

Example 2 of Mounting

Figure 14:
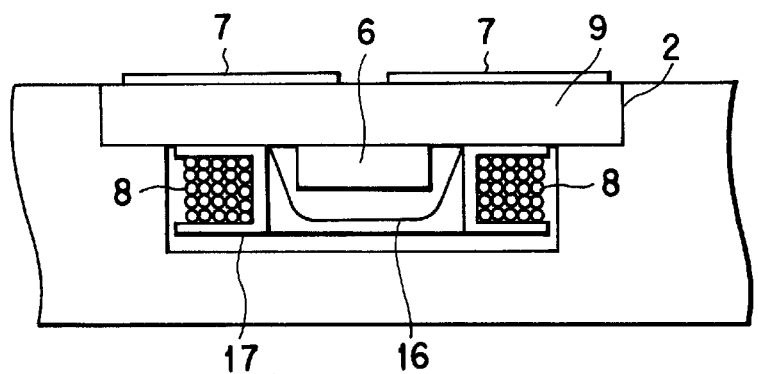
FIG. 14 shows a second example of arrangement of the antenna coil according to the third embodiment.

FIG. 14 shows an example of mounting, wherein the first coupler coil 8 wound around a coil frame 17, which is provided around the seal resin 16 of IC chip 6, is mounted.

The first coupler coil 8 is regularly wound along grooves (not shown) of the coil frame 17. The first coupler coil 8 wound around the coil frame 17 is bonded between the coil frame 17 and module substrate 9. Then, connection terminals (not shown) of the first coupler coil 8 are connected to a predetermined circuit pattern (not shown) on the module substrate 9.

In this case, the coil frame 17 is provided with terminals for connection with the coil and thereby the connection between the module substrate 9 and first coil 8 is made simpler. Although the cross-sectional shape of the coil frame 17 in this embodiment is rectangular with rounded corners, it may be circular, etc., as with the above-described cases.

Example 3 of Mounting

Figure 15A:
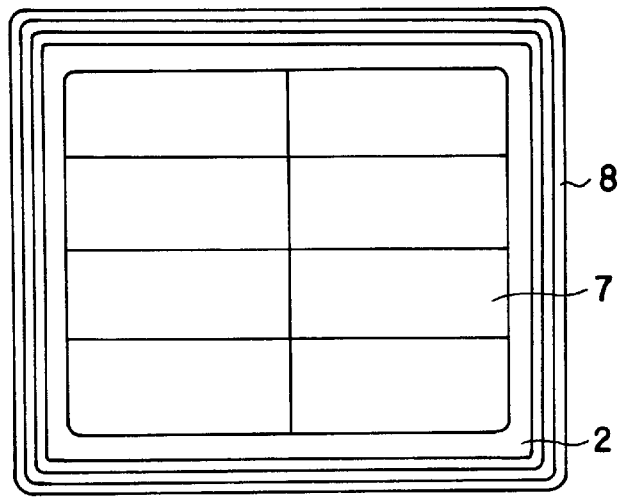
FIG. 15A and FIG. 15B show a third example of arrangement of the antenna coil according to the third embodiment.
Figure 15B:
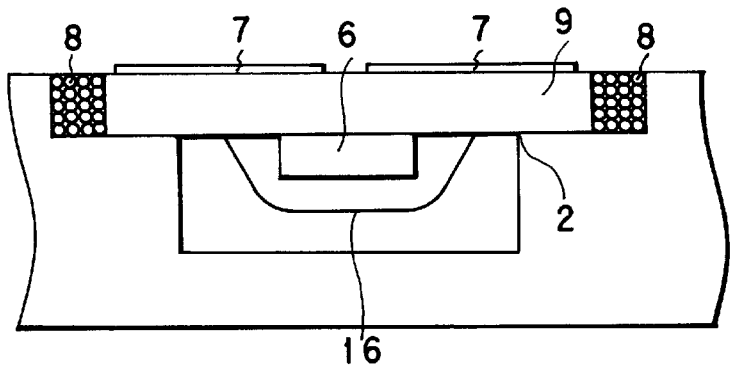

FIGS. 15A and 15B show an example of mounting, wherein the first coupler coil 8 is wound around end faces of the module substrate 9.

The first coupler coil 8 can also be formed by applying a coil to the periphery (in thickness direction) of the module substrate 9 of the IC module 2 with rounded corners. The winding of the coil around the periphery of the module substrate 9 was carried out prior to the mounting of the IC chip 6. This step may be carried out after the fabrication of the IC module 2, and the order of steps is not limited.

In the case were the coil is applied to the periphery (in thickness direction) of the module substrate 9 of the IC module 2 with rounded corners, the coil can be wound with a width of 1 mm from the outer contour of the module substrate 9 if the thickness of the module substrate 9 is 0.3 mm, even in consideration of the formation of embossing. If the diameter of the coil wire is 0.1 mm, 3×10=30 turns can be wound. This number is five times as large as in the case of forming the coil by print patterning.

The smart card according to the third embodiment has functions compatible with both the contact-type system with external terminals and the non-contact-type system with non-contact coupling elements such as an antenna coil. In the smart card incorporating the IC module, since transformer-coupling circuit elements are disposed between the IC module and antenna coil, power reception and signal transmission/reception can be effected between the IC module and antenna coil without electrical connection.

The transformer coupling element of the IC module is realized by a coil and the coil is directly wound around the periphery of the seal resin of the IC chip. Alternatively, the planar coil prepared in advance is directly bonded to the module substrate. Alternatively, a coil is wound around the coil frame and the coil frame is bonded to the module substrate, or the coil is wound around the end faces of the module substrate. Thereby, the number of turns of the coupler coil of the module substrate is increased as much as possible. As a result, in the smart card incorporating the IC module, electromagnetic energy received by the antenna coil can be transmitted to the IC chip by transformer coupling with a high coupling coefficient.

Accordingly, when the card is exposed to the vicinity of the antenna of the external read/write apparatus, communicable sensitivity characteristics can be enhanced, which is the advantage of the non-contact communication function.

Since the reception sensitivity of the card is enhanced, the communication distance is increased sand/or the transmission output of the external read/write apparatus can be reduced. This is convenient for IC cards since the transmission output for non-contact type IC cards (smart cards) is restricted by the Wireless Telegraphy Act.

Moreover, since no connection is required between the IC module and the antenna circuit built in the card substrate, it is possible to use, without any modification, the conventional IC card fabrication step of attaching and mounting the IC module in the engagement hole formed in the card substrate. Furthermore, even if a mechanical stress such as a bending stress acts on the card, there is little possibility of fault because of the absence of any contact point between the IC module and the antenna circuit.

As has been described above, according to the third embodiment, there are provided a smart card and an IC module wherein, despite no connection being required between the IC module and non-contact transmission antenna coil, a reception sensitivity capable of obtaining an adequate communication distance is attained and both a contact-type and a non-contact-type transmission mechanism are maintained in practical operation states.

A description will now be given of a method of fabricating the capacitive element constituting the resonance circuit along with the antenna coil 4 of the non-contact transmission mechanism in the present invention. Where a chip capacitor is used as the capacitive element of the IC card, the chip capacitor itself or the wiring pattern on the substrate on which electronic circuits are mounted may easily be broken if a bending force, etc. acts on the card. Consequently, the reliability of the IC card deteriorates, and the IC card becomes thicker due to the thickness of the chip capacitor component. Moreover, since the coil is formed of conductor wire, the handling of the coil requires care so as not to cause deformation in the coil and problems with manufacture tend to arise. In the present invention, in order to overcome such problems, the capacitive element is formed of conductors sandwiching the card substrate.

Concrete Example 1

Figure 16A:
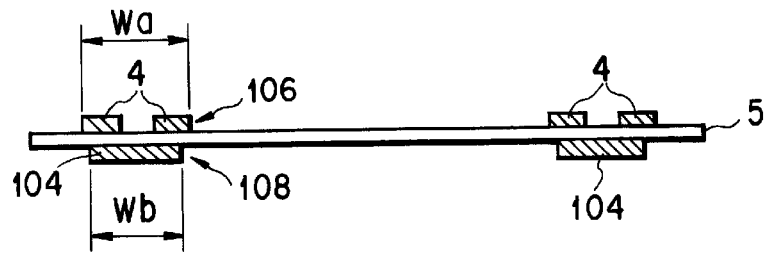
FIG. 16A and FIG. 16B show a first example of the structure of a capacitive element in the present invention.
Figure 16B:
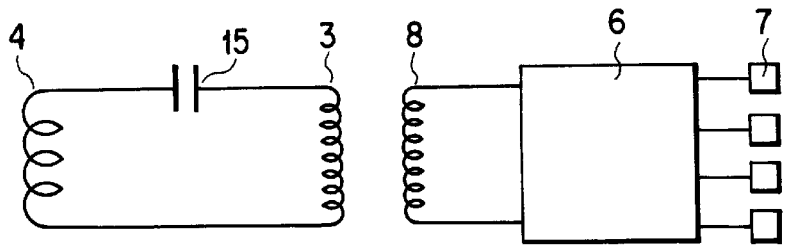

FIG. 16A is a cross-sectional view of the same card substrate as is shown in FIGS. 3B, 8B and 12B. FIG. 16B shows an equivalent circuit of the card substrate shown in FIG. 16A. An antenna coil 4 realized as a wiring pattern using a conductive material is disposed on a peripheral portion of one surface of the substrate 5. Only one end of the antenna coil 4 is connected to one end of the second coupler coil 3, and the other end of the antenna coil 4 is opened.

On the other hand, the other end of the second coupler coil 3 is guided to the other surface of the substrate 5 and connected to a conductor 104 formed of a conductive material on the other surface of the substrate 5 so as to be opposed to the antenna coil 4.

A static capacitance is constituted by a pattern of conductive material forming the antenna coil 4 on the one surface, and the conductor 104 formed of conductive material on the other surface. Thus, a series capacitive element 15 in the equivalent circuit shown in FIG. 16B is obtained.

As is shown in FIG. 16A, the width Wa of the antenna coil 4 and the width Wb of the conductor 104 should not necessarily be made exactly equal, if a necessary static capacitance is obtained. However, it is desirable, as a minimum requirement, that end faces 108 of the conductor 104, the width between which is Wb, be disposed so as not to project out from end faces 106 of the antenna coil 4, the width between which is Wa. This can prevent a decrease in the coil area provided by the antenna coil 4.

In FIG. 16A, the number of turns of the antenna coil 4 is two. The number of turns of the antenna coil 4 and the pattern width thereof are determined in accordance with a necessary inductance and static capacitance. Since the other end of the antenna coil 4 can be opened at a desired location, the inductance of the antenna coil 4, the number of turns of which is one or more, can be adjusted by the length of the pattern of the antenna coil 4. On the other hand, needless to say, the area of the conductor 104 opposed to the antenna coil 4 can be freely set to obtain a necessary static capacitance. Therefore, compared to the conventional method in which the inductance of the coil can be adjusted only by the area of the coil and the number of turns thereof, the inductance and static capacitance can be easily adjusted.

Concrete Example 2

Figure 17A:
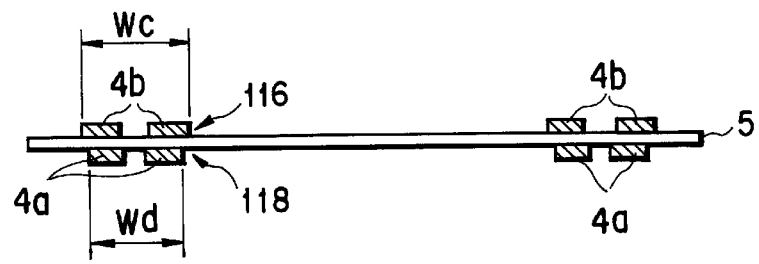
FIG. 17A and FIG. 17B show a second example of the structure of the capacitive element in the present invention.
Figure 17B:
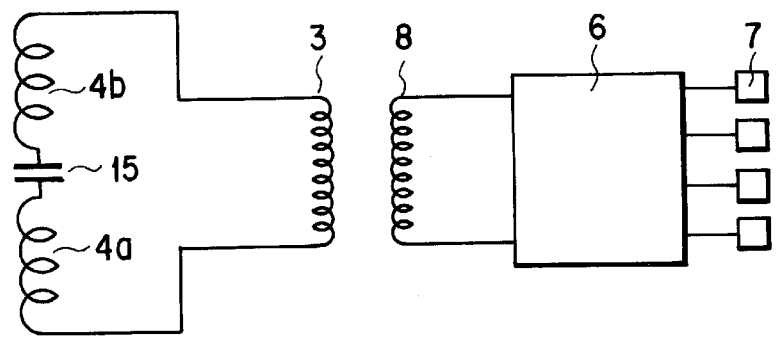

FIG. 17A is a cross-sectional view of the same card substrate as is shown in FIGS. 3B, 8B and 12B. FIG. 17B shows an equivalent circuit of the card substrate shown in FIG. 17A. A second antenna coil 4b realized as a wiring pattern using a conductive material is disposed on a peripheral portion of one surface of the substrate 5. One end of the second antenna coil 4b is connected to the second coupler coil 3, and the other end of the second antenna coil 4b is opened.

On the other hand, the other end of the second coupler coil 3 is guided to the other surface of the substrate 5 and connected to one end of a first antenna coil 4a which is realized as a wiring pattern using a conductive material on the other surface of the substrate 5 so as to be opposed to the second antenna coil 4b. The other end of the first antenna coil 4a is disposed to be opened.

A static capacitance is constituted by the pattern of conductive material forming the second antenna coil 4b on the one surface, and the pattern of conductive material forming the first antenna coil 4a on the other surface. Thus, the series capacitive element 15 in the equivalent circuit shown in FIG. 17B is obtained.

As is shown in FIG. 17A, the width Wc of the second antenna coil 4b and the width Wd of the first antenna coil 4a should not necessarily be made exactly equal, if a necessary static capacitance is obtained. However, it is desirable, as a minimum requirement, that end faces 118 of the first antenna coil 4a, the width between which is Wd, be disposed so as not to project out from end faces 116 of the second antenna coil 4b, the width between which is Wc. This can prevent a decrease in the coil area provided by the second antenna coil 4b.

In FIG. 17A, the number of turns of the antenna coils 4a, 4b is two. The number of turns of the second antenna coil 4b and first antenna coil 4a, and the pattern widths thereof are determined in accordance with a necessary inductance and static capacitance. Since the other end of the second antenna coil 4b and the other end of the first antenna coil 4a can be opened at desired locations, the inductance of the second antenna coil 4b can be adjusted by the length of the pattern of the second antenna coil 4b and the inductance of the first antenna coil 4a can be adjusted by the length of the pattern of the first antenna coil 4a. On the other hand, needless to say, since the static capacitance increases in accordance with an area with which the second antenna coil 4b is opposed to the first antenna coil 4a, it is necessary to provide such an area with which the second antenna coil 4b is opposed to the first antenna coil 4a. Therefore, compared to the conventional method in which the inductance of the coil can be adjusted only by the area of the coil and the number of turns thereof, the inductance and static capacitance can be easily adjusted.

Concrete Example 3

Figure 18A:
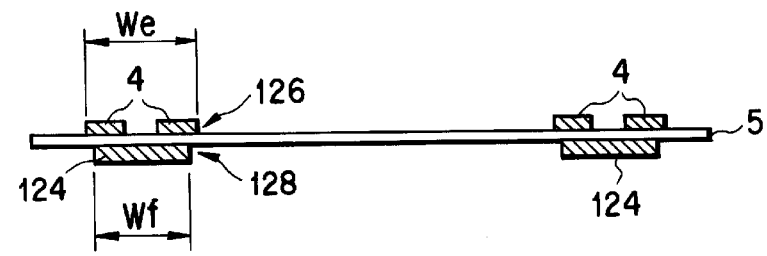
FIG. 18A and FIG. 18B show a third example of the structure of the capacitive element in the present invention.
Figure 18B:
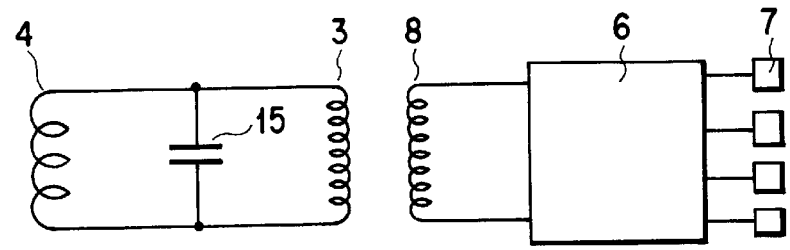

FIG. 18A is a cross-sectional view of the same card substrate as is shown in FIGS. 3B, 8B and 12B. FIG. 18B shows an equivalent circuit of the card substrate shown in FIG. 18A. The antenna coil 4 realized as a wiring pattern using a conductive material is disposed on a peripheral portion of one surface of the substrate 5. One end of the antenna coil 4 is connected to one end of the second coupler coil 3, and the other end of the antenna coil 4 is connected to the other end of the second coupler coil 3. A conductor 124 using a conductor material is disposed on the other surface of the substrate 5 so as to be opposed to the antenna coil 4.

The static capacitance is a combination of a static capacitance between adjacent patterns of the antenna coil 4 and a static capacitance between the conductor 124 and antenna coil 4. Thus, the series capacitive element 15 in the equivalent circuit shown in FIG. 17B is obtained.

As is shown in FIG. 18A, the width we of the antenna coil 4 and the width Wf of the conductor 124 should not necessarily be made exactly equal, if a necessary static capacitance is obtained. However, it is desirable, as a minimum requirement, that end faces 128 of the conductor 124, the width between which is Wf, be disposed so as not to project out from end faces 126 of the antenna coil 4, the width between which is We. This can prevent a decrease in the coil area provided by the antenna coil 4.

In FIG. 18A, the number of turns of the antenna coil 4 is two. The number of turns of the antenna coil 4 and the pattern width thereof are determined in accordance with a necessary inductance and static capacitance.

As has been described above, according to the present invention, the following smart cards and smart card modules are realized:

(1) A smart card having both a function of a contact type and a function of a non-contact type, the smart card comprising an IC module and an antenna element. The IC module comprises an IC chip incorporating a contact-type transmission function and a non-contact-type transmission function, and a module substrate having an external terminal serving as a contact-type transmission element and a first coupler coil, and the antenna element comprises an antenna for performing at least one of power reception and signal transmission/reception with an external read/write apparatus, and a second coupler coil connected to the antenna. The first coupler coil of the IC module and the second coupler coil of the antenna element for non-contact transmission are disposed to be closely coupled to each other, and the IC module and the antenna element are coupled in a non-contact manner by transformer coupling.

(2) In the smart card according to (1), the antenna element has a capacitive element.

(3) The smart card according to (1) or (2) further comprising an embossing region. The IC module is provided at a substantially central portion of one shorter side of the card, and the embossing region is provided along one longer side of the card, and the antenna for non-contact transmission is provided so as not to interfere with an external terminal region of the IC module or the embossing region.

(4) The smart card described in (1) or (2) further comprising an embossing region. The IC module is provided at a substantially central portion of one shorter side of the card, and the embossing region is provided along one longer side of the card, and the antenna for non-contact transmission is provided at a region defined by a longer side of the card opposed to the one longer side along which the embossing region is provided, a boundary of the embossing region on an inner side of the card, a boundary of the external terminal region of the IC module on the inner side of the card, and a shorter side of the card opposed to the one shorter side at which the IC module is provided, so as not to interfere with an external terminal region of the IC module and the embossing region.

(5) The smart card described in (1) or (2) further comprising an embossing region. The IC module is provided at a substantially central portion of one shorter side of the card, and the embossing region is provided along one longer side of the card, and at least a portion of said antenna for non-contact transmission is disposed between the embossing region and an edge of the card and between an external terminal region of the IC module and an edge of the card, and provided along a periphery of the card so as not to interfere with the external terminal region of the IC module and the embossing region.

(6) The smart card described in (1) or (2) further comprising a magnetic stripe region and an embossing region. The IC module is provided at a substantially central portion of one shorter side of the card, the embossing region is provided along one longer side of the card, and the magnetic stripe region is provided along the other longer side of the card. The antenna for non-contact transmission is provided so as not to interfere with an external terminal region of the IC module, the embossing region, and the magnetic stripe region.

(7) The smart card described in (1) or (2) further comprising a magnetic stripe region and an embossing region. The IC module is provided at a substantially central portion of one shorter side of the card, the embossing region is provided along one longer side of the card, and the magnetic stripe region is provided along the other longer side of the card. The antenna for non-contact transmission is provided substantially along a boundary of the magnetic stripe region on an inner side of the card, a boundary of the embossing region on an outer peripheral side of the card, and a boundary of an external terminal region of the IC module on the outer peripheral side of the card, so as not to interfere with an external terminal region of the IC module, the embossing region, and the magnetic stripe region.

(8) The smart card described in (1) or (2) further comprising a magnetic stripe region and an embossing region. The IC module is provided at a substantially central portion of one shorter side of the card, the embossing region is provided along one longer side of the card, and the magnetic stripe region is provided along the other longer side of the card. The antenna for non-contact transmission is provided at a region defined by a boundary of the embossing region on an inner side of the card, a boundary of an external terminal region of the IC module on the inner side of the card, a boundary of the magnetic stripe region on the inner side of the card and a shorter side opposed to the one shorter side at which the IC module is provided, so as not to interfere with an external terminal region of the IC module, the embossing region, and the magnetic stripe region.

(9) In the smart card described in (1) or (2), the second coupler coil of the antenna element is disposed outside a loop of the antenna.

(10) In the smart card described in any one of (1) to (9), the second coupler coil and the first coupler coil are nested in substantially the same plane.

(11) In the smart card described in any one of (1) to (9), the second coupler coil and the first coupler coil are nested in substantially the same plane, an inner contour of the second coupler coil is greater than an outer contour of an engagement hole at which the IC module is disposed in the card, and the first coupler coil is disposed on a surface of the module substrate which is opposite to a surface on which the external terminal is provided.

(12) In the smart card described in any one of (1) to (9), the second coupler coil and the first coupler coil are nested in substantially the same plane, and the first coupler coil has at least a conductor coil coated with an insulation film and wound around the IC chip provided on a surface of the module substrate that is opposite to a surface on which the external terminal is provided.

(13) In the smart card described in any one of (1) to (9), the second coupler coil and the first coupler coil are nested in substantially the same plane, and the first coupler coil has a conductor coil coated with an insulation film and toroidally wound around the IC chip provided on a surface of the module substrate that is opposite to a surface on which the external terminal is provided.

(14) In the smart card described in any one of (1) to (9), the second coupler coil and the first coupler coil are nested in substantially the same plane, and the first coupler coil has a conductor coil coated with an insulation film and toroidally wound near the IC chip provided on a surface of the module substrate that is opposite to a surface on which the external terminal is provided.

(15) In the smart card described in any one of (1) to (9), the second coupler coil and the first coupler coil are nested in substantially the same plane, and the first coupler coil has at least a coil of a conductor pattern formed around or near the IC chip provided on a surface of the module substrate that is opposite to a surface on which the external terminal is provided.

(16) In the smart card described in any one of (1) to (9), the first coupler coil is formed of a coil fabricated by winding conductor wire coated with an insulation film.

(17) In the smart card described in any one of (1) to (9), the first coupler coil is formed of a coil fabricated by winding conductor wire coated with an insulation film, and the coil is toroidally wound around a seal member of the IC chip.

(18) In the smart card described in any one of (1) to (9), the first coupler coil is formed of a coil fabricated by winding conductor wire coated with an insulation film, and the coil is wound around an outer peripheral end face of the module substrate.

(19) In the smart card described in any one of (1) to (18), the IC chip and the first coupler coil are resin-sealed on a side of the IC module on which the IC chip is mounted.

(20) In the smart card described in any one of (1) to (19), the antenna element has a capacitive element connected to the antenna and the second coupler coil.

(21) In the smart card described in (20), the capacitive element is connected in parallel to the antenna coil and the second coupler coil.

(22) In the smart card described in (20), the capacitive element is connected in series to the antenna coil and the second coupler coil.

(23) In the smart card described in (20), the capacitive element is formed of conductor layers so provided on both surfaces of the antenna substrate as to sandwich the antenna substrate.

(24) In the smart card described in (20), the capacitive element is formed of an antenna layer provided on one surface of the antenna substrate and a conductor layer which is provided on the other surface of the antenna substrate and cooperates with the antenna layer to sandwich the antenna substrate.

(25) An IC module according to the present invention comprising an IC chip incorporating a non-contact-type transmission function and a contact-type transmission function, and a module substrate having a first coupler coil and an external terminal serving as a contact-type transmission element. The first coupler coil is provided on a side of the module substrate which is opposite to a side on which the external terminal is provided, and is formed of a winding coil fabricated by winding conductor wire coated with an insulation film.

(26) In the IC module described in (25), the winding coil is spirally wound on at least one of a periphery and a vicinity of the IC chip.

(27) In the IC module described in (25), the winding coil is toroidally wound on at least one of a periphery and a vicinity of the IC chip.

(28) In the IC module described in (25), the winding coil is wound around an outer peripheral end face of the module substrate.

(29) In the IC module described in any one of (25) to (28), the IC chip and the first coupler coil are resin-sealed on a side of the IC module on which the IC chip is mounted.

(30) In the IC module described in any one of (25) to (28), a size of the module substrate is substantially equal to a size of a region of the external terminal.

(31) An IC module according to the present invention comprising an IC chip incorporating a contact-type transmission function and a non-contact-type transmission function, and a module substrate having a first coupler coil and an external terminal serving as a contact-type transmission element, The first coupler coil is formed of a patterned conductor on a side of the module substrate which is opposite to a side on which the external terminal is provided, and is disposed on at least one of a periphery and a vicinity of the IC chip.

(32) In the IC module described in (31), the coil is wound around a seal member of the IC chip in at least one of a spiral manner and a toroidal manner.

(33) In the IC module described in (31), the IC chip and the first coupler coil are resin-sealed on a side of the IC module on which the IC chip is mounted.

(34) In the IC module described in (31), a size of the module substrate is substantially equal to a size of a region of the external terminal.

According to the present invention, there are provided an IC module having reception sensitivity enough to obtain an adequate communication distance, despite no wired connection disposed between the IC module and a non-contact transmission antenna, and being capable of maintaining both a contact-type and a non-contact-type transmission mechanism in practical operation states, and a smart card including the IC module.

There are also provided a smart card wherein power efficiency on the power reception side (or signal transmission efficiency) is improved and impedance conversion is performed, and an IC module for the smart card.

There are also provided an IC module and a smart card having a magnetic stripe and an embossed portion on a surface of the card, wherein power-reception-side power efficiency is improved and impedance conversion is effected without adversely affecting formation of the magnetic stripe and embossed portion and the thickness of the card can be reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A smart card having both a function of a contact and a function of a non-contact, the smart card comprising an IC module and an antenna element, wherein
    said IC module comprises an IC chip incorporating a contact transmission function and a non-contact transmission function, and a module substrate having an external terminal serving as a contact transmission element and a first coupler coil,
    said antenna element comprises an antenna for performing at least one of power reception and signal transmission/reception with an external read/write apparatus, and a second coupler coil connected to said antenna, and
    said first coupler coil of said IC module and said second coupler coil of said antenna element for non-contact transmission are disposed to be closely coupled to each other, and said IC module and said antenna element are coupled in a non-contact manner by transformer coupling.

2. The smart card according to claim 1, wherein said antenna element has a capacitive element.

3. The smart card according to claim 1 or 2, further comprising an embossing region, and wherein
    said IC module is provided at a substantially central portion of one shorter side of the card, and the embossing region is provided along one longer side of the card, and
    said antenna for non-contact transmission is provided so as not to interfere with an external terminal region of the IC module and the embossing region.

4. The smart card according to claim 1 or 2, further comprising an embossing region, and wherein
    said IC module is provided at a substantially central portion of one shorter side of the card, and the embossing region is provided along one longer side of the card, and
    said antenna for non-contact transmission is provided so as not to interfere with an external terminal region of the IC module and the embossing region, said antenna being provided at a region defined by a longer side of the card opposed to said one longer side along which the embossing region is provided, a boundary of the embossing region on an inner side of the card, a boundary of the external terminal region of the IC module on the inner side of the card, and a shorter side of the card opposed to said one shorter side at which the IC module is provided.

5. The smart card according to claim 1 or 2, further comprising an embossing region, and wherein
    said IC module is provided at a substantially central portion of one shorter side of the card, and the embossing region is provided along one longer side of the card, and
    at least a portion of said antenna for non-contact transmission is disposed between the embossing region and an edge of the card and between an external terminal region of the IC module and the edge of the card, and provided along a periphery of the card so as not to interfere with the external terminal region of the IC module and the embossing region.

6. The smart card according to claim 1 or 2, further comprising a magnetic stripe region and an embossing region, and wherein said IC module is provided at a substantially central portion of one shorter side of the card, the embossing region is provided along one longer side of the card, and the magnetic stripe region is provided along the other longer side of the card, and said antenna for non-contact transmission is provided so as not to interfere with an external terminal region of the IC module, the embossing region, and the magnetic stripe region.

7. The smart card according to claim 1 or 2, further comprising a magnetic stripe region and an embossing region, and wherein said IC module is provided at a substantially central portion of one shorter side of the card, the embossing region is provided along one longer side of the card, and the magnetic stripe region is provided along the other longer side of the card, and said antenna for non-contact transmission is provided substantially along a boundary of the magnetic stripe region on an inner side of the card, a boundary of the embossing region on an outer peripheral side of the card, and a boundary of an external terminal region of the IC module on the outer peripheral side of the card, so as not to interfere with an external terminal region of the IC module, the embossing region, and the magnetic stripe region.

8. The smart card according to claim 1 or 2, further comprising a magnetic stripe region and an embossing region, and wherein said IC module is provided at a substantially central portion of one shorter side of the card, the embossing region is provided along one longer side of the card, and the magnetic stripe region is provided along the other longer side of the card, and said antenna for non-contact transmission is provided at a region defined by a boundary of the embossing region on an inner side of the card, a boundary of an external terminal region of the IC module on the inner side of the card, a boundary of the magnetic stripe region on the inner side of the card and a shorter side opposed to said one shorter side at which the IC module is provided, so as not to interfere with an external terminal region of the IC module, the embossing region, and the magnetic stripe region.

9. The smart card according to claim 1 or 2, wherein said second coupler coil of the antenna element is disposed outside a loop of the antenna.

* * * * *